Jan. 24, 1961
F. O. HESS
2,968,894
ANNEALING LEHR
Filed March 4, 1955
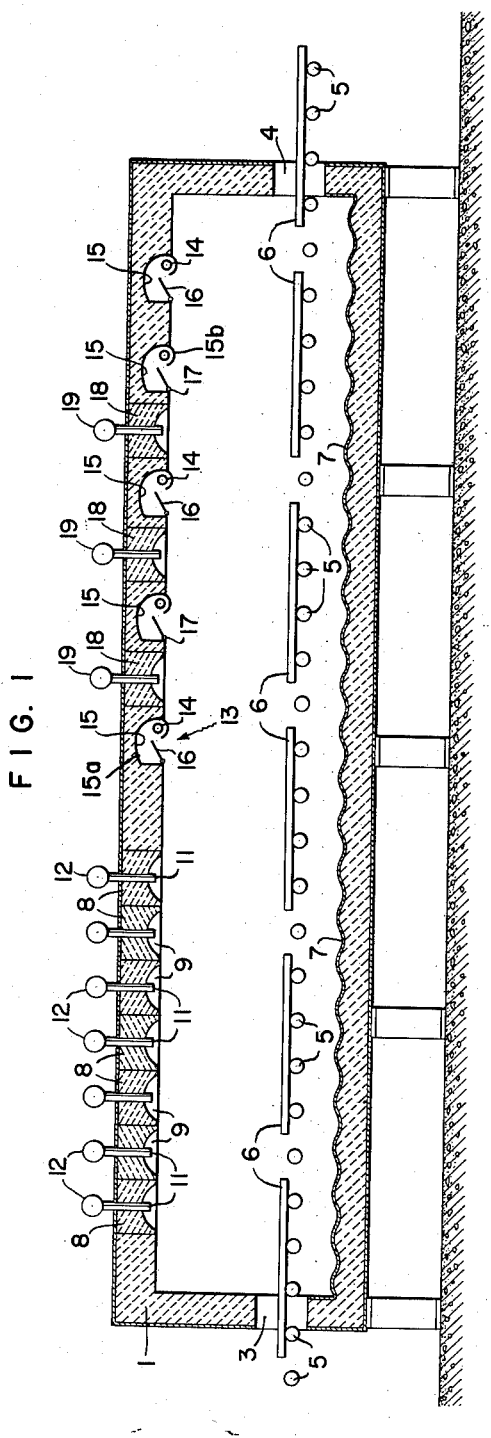
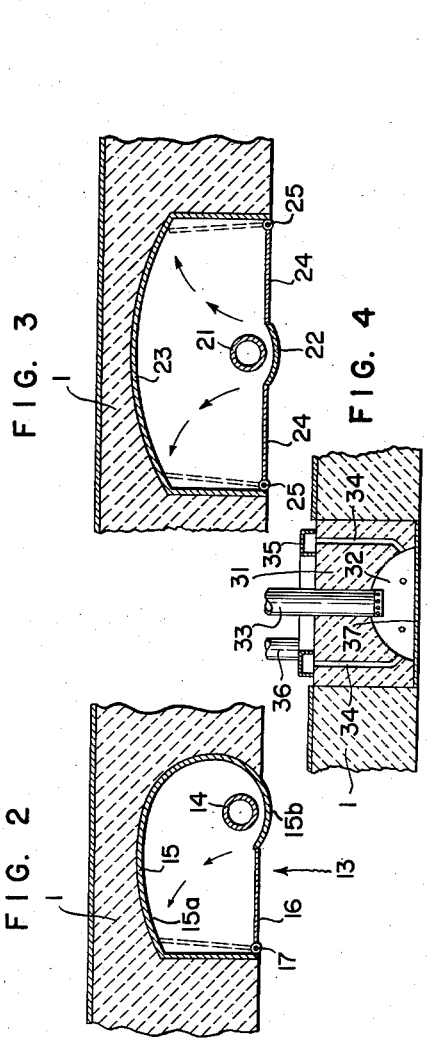
*INVENTOR.*
FREDERIC O. HESS
BY
ATTORNEY.

United States Patent Office 2,968,894
Patented Jan. 24, 1961

2,968,894

ANNEALING LEHR

Frederic O. Hess, Philadelphia, Pa., assignor to Selas Corporation of America, Philadelphia, Pa., a corporation of Pennsylvania Filed Mar. 4, 1955, Ser. No. 492,134

4 Claims. (Cl. 49—47)

The present invention relates to furnaces, and more particularly to a continuous furnace in which the cooling of the heated material through its cooling range can be accurately controlled. The furnace and its cooling provisions can be used for the heating and cooling of any material such as a continuous strip of metal or consecutive sheets of some material such as glass. For purposes of example only, the furnace will be described primarily as it would be used in the annealing of glass sheets.

In the annealing of glass, it is necessary to heat the material to a temperature approaching its softening point, hold it at this temperature until the temporary stresses are relieved and then to cool it below its strain point. During the cooling cycle, it is necessary to reduce the glass temperature slowly enough, so that no stresses will remain in the finished product. On the other hand, it is desirable to cool the glass as quickly as possible. It has been found that the theoretical cooling time is considerably less than that used in commercial practice. There are several reasons for this, one of them being the variety of shapes and compositions of glass that are annealed in a single lehr. The relatively inflexible operation of annealing lehrs requires that they be designed to operate much slower than is actually necessary in order to insure that the glass will not be cooled too quickly.

It is the main object of the invention to provide apparatus for continuously heating and cooling material with the apparatus being so designed that the rate of cooling of the heated material can be accurately controlled as it is moving through the cooling zone of the apparatus both along its length and across its width.

It is also an object of the present invention to provide an annealing furnace that is particularly adapted for the annealing of glass of various compositions and thicknesses. It is a further object of the invention to provide an annealing furnace or lehr in which the glass can be cooled at a rate which is nearly equal to the theoretical cooling rate.

A further and more specific object of the invention is to provide a lehr in which the rate of cooling of glass can be varied and closely regulated. The adjustable provision permits a single lehr to be used for cooling glasses of various compositions and thicknesses at an optimum rate for a particular product.

In accordance with the present invention, there is provided a furnace having a longitudinally extending chamber through which the work to be heated is moved. At one end of this chamber is provided means for heating the work to a temperature above its annealing temperature. Adjacent to the other or exit end of the furnace is provided means to cool the work at a controlled rate. The cooling means is adjustable, so that the rate of cooling can be changed from time to time as necessary or desirable. The cooling rate is adjusted by varying the amount of heat, radiated from the hot work, that is withdrawn from the chamber.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

Figure 1 is a longitudinal section of the lehr;

Figure 2 is an enlarged view showing a section through a cooling unit;

Figure 3 is an enlarged view showing a view through a modified form of cooling unit; and Figure 4 is a view of a different form of burner that can be used.

Referring to the drawings, there is shown at 1 an elongated furnace or lehr that is adapted particularly for the annealing of glass. This furnace is constructed in accordance with ordinary furnace practice, the walls thereof being made of refractory and insulating material that are preferably backed up in the usual manner by sheet metal. The furnace or lehr is provided with a chamber 2 having an entrance opening 3 in one end and an exit opening 4 in the other end. There is provided a conveyor 5 shown herein as consisting of a plurality of driven rolls by means of which glass sheets 6 can be moved from one end of the furnace to the other as they are being annealed. The furnace is provided with a floor consisting of a sheet 7 of material which is capable of reflecting radiant heat. Such material may be stainless steel or other metal that will withstand the temperatures that are encountered in the furnace chamber.

Located in the roof of the furnace are a plurality of rows of burners 8 that are of the type shown in Hess Patent 2,215,079 with each row extending across the furnace chamber. Each burner includes a cup-like depression 9 into the base of which projects a distributor member 11. A combustible mixture of fuel and air is supplied to each burner through the distributor from which it is discharged in a plurality of radially directed jets that burn along the surface of the cup 9 to heat the cup to incandescence. Radiant heat is directed from the cup to the glass sheets 6 travelling along the conveyor 5. Heat is also reflected from the floor 7 toward the bottom of the sheets. Each of the rows of burners is supplied with the combustible mixture through a manifold 12 that may be adjusted in a conventional manner by a valve (not shown).

Located in the roof of the furnace beyond the burners are a plurality of cooling units 13, one of which is shown enlarged in Figure 2. These cooling units include a pipe 14 that extends across the furnace chamber. Each of these pipes is preferably black, so that it will absorb radiation, and is cooled by water flowing through it. Surrounding the pipes and cooperating therewith are metal members 15 that have reflector portions 15a, which are so shaped that radiant heat received by these reflector portions, from the hot glass passing beneath them, will be reflected toward and concentrated upon the pipes 14. It is noted that each member 15 extends around a pipe 14, and terminates in a baffle portion 15b between the glass and the pipe. Thus, each pipe is protected by a portion 15b from direct radiation from the chamber. In order to control the amount of radiation that is received by each of the reflectors, there is provided a shield 16 that is pivoted at 17. These shields may be moved from their full line position in Figure 2 in which they prevent any radiation from being received by the reflector to the dotted position in which the entire opening below the reflector is opened for the reception of radiant heat.

Also located in the roof of the furnace chamber, and between each of the cooling units, are rows of burners 18 similar to the burners 8. Each row of these burners is also supplied by a common manifold 19 in which a valve, not shown, is used to vary the flow of fuel.

Another form that the cooling unit may take is shown in Figure 3. In this form, there is provided a black, water cooled pipe 21 that extends across the furnace. Cooperating with the pipe and between this pipe and any glass that is moving along the conveyor, there is provided a baffle 22 to protect the pipe from direct radiation. Back of the pipe is a reflector 23 that is shaped to direct radiation received by it against the pipe. Shields 24, which are adjustable around pivots 25, control the amount of radiation that is received by the reflector and directed toward the pipe.

In the operation of the apparatus when it is used as a lehr, glass sheets 6 to be annealed are moved by the conveyor 5 through the entrance of the furnace chamber 2. As these sheets pass beneath burners 8, they are heated to a temperature in the neighborhood of 1200° F. This temperature is sufficient to bring the glass almost to the softening point and to relieve any permanent internal stress. After these permanent stresses have been relieved, the glass is moved under the cooling units, so that it can be cooled at a controlled rate through the critical annealing range. This range will vary with glasses of different compositions but is generally in the neighborhood of 1050° F., to 950° F. During the time that the glass is being cooled, heat must be removed therefrom at a rate slow enough to prevent permanent internal strains. On the other hand, it is desirable to remove the heat as quickly as possible in order to speed up the process and to reduce the length of the furnace. As the heated glass moves under the cooling units, heat will be radiated from the glass to them. By varying the position of shields 16, the amount of heat absorbed by pipe 14, and withdrawn from the chamber, can be accurately controlled. In order to control exactly the cooling rate and maintain the temperature of the glass even from side to side of the chamber, it may be necessary to add additional heat to the chamber in the cooling zone. This is the purpose of burners 18. They are fired sufficiently to maintain a given temperature at various points along the cooling zone. This will prevent the glass from losing its heat too rapidly.

By the time a glass sheet has reached the exit of the chamber, it will have been cooled down below its strain point. Further cooling of the glass to atmospheric temperature can take place at an accelerated rate either in the open or in a suitable further cooling zone.

When the furnace is used for the annealing of strip steel, for example, it is highly desirable, if not necessary, to maintain a neutral atmosphere in at least the cooling portion thereof. Some water vapor that can have an oxidizing effect on the strip is present in all products of combustion. Therefore, burners of the type shown in Figure 4 can be used in the furnace, and particularly in the cooling end thereof. This burner is of the kind previously described, except that provision is made for withdrawing the products of combustion from the rear of the burner rather than discharging them into the furnace chamber.

Referring to Figure 4, there is shown a burner 31 which is formed of a block of refractory material having a cup-shaped depression 32 in its face. Fuel in the form of a combustible mixture of gas and air is discharged into the cup in a plurality of radially directed jets by a distributor member 33 and burns along the surface of the cup to heat it to incandescence. The products of combustion are withdrawn through a plurality of passages 34 to the rear of the burner where they are collected in an annular manifold 35 and discharged to some suitable point through an exhaust pipe 36. A disc 37 of some material such as a heat resistant glass that is transparent to infra-red rays is placed in front of cup 32 further to insure that no products of combustion pass into the furnace chamber.

In the annealing of strip metal, for example, the furnace is operated in the manner previously described. The strip is heated by burners 8 to its critical range of 1400° F. to 1600° F., and is cooled at a controlled rate to a temperature below which it will not oxidize in the atmosphere. The cooling rate is controlled by the adjustment of shields 16 or 24, as the case may be, and the firing of the burners between the cooling units. As stated above, when strip metal is being treated, burners of the type shown in Figure 4 are preferably used in place of burners 18. Burners of this type could also be used in place of burners 8 in the heating section of the furnace, if desired.

Frequently metal strip has a tendency to cool more rapidly at its edges than at its center. For uniform annealing, however, it is necessary that the metal be cooled uniformly throughout its width. This can be accomplished with the present invention by making the shields 16 and 24 in sections across the width of the furnace. Those sections near the edges of the furnace can then be adjusted to permit less heat to be absorbed by the water cooled pipes than is absorbed by these pipes near the center of the furnace. Thus, the rate of cooling can be controlled not only along the length of a strip, but also across its width.

It will be seen that the work is heated by imparting radiant heat to it and is cooled by withdrawing radiant heat from it in controlled amounts. This method of heating and cooling does away with any drafts or currents of air within the chamber that would have a tendency to produce uneven heating or cooling of the glass sheets or other material as it is passing through the furnace chamber. The adjustment of the shields 16 in combination with the adjustment of burners 18 provides a means of controlling the cooling rate of heated work that is accurate and efficient. The apparatus of the present invention can be used, for example, with glass of any composition to cool the same through the critical annealing range at a rate that is practically equal to the theoretical cooling time. The cooling unit can be easily adjusted for any type of glass or thickness thereof and can be held in adjustment while this particular glass is being annealed. By being able to adjust accurately the amount of heat removed from the work and the chamber at particular points along the path of the work, it is possible to obtain the fastest cooling rate at which annealing can be safely accomplished.

While in accordance with the provisions of the statutes, I have illustrated and described the best form of embodiment of my invention now known to me it will be apparent to those skilled in the art that changes my be made in the form of the apparatus disclosed without departing from the spirit and scope of the invention as set forth in the appended claims, and that in some cases certain features of my invention may be used to advantage without a corresponding use of other features.

What is claimed is:

1. In a furnace, structure forming an elongated chamber having an entrance, an exit and a roof, a conveyor extending through said chamber below said roof and upon which work to be heat treated is carried, heating means in said chamber adjacent to the entrance to heat work on said conveyor, a plurality of tubes in said roof and extending at spaced positions across said chamber adjacent to its exit, each of said tubes adapted to have a cooling fluid flowing through it, and means cooperating with each tube having baffle portions in front of said tubes to protect said tubes from direct radiation of heat from work on said conveyor, and having reflector portions in said roof to direct radiant heat emanating from work on said conveyor to said tubes.

2. In an annealing lehr, the combination of structure forming an elongated chamber having an entrance, an exit and a roof, a conveyor for carrying work to be heat treated extending through said chamber from end to end, means in said chamber adjacent to the entrance to heat work carried by said conveyor, and means in said chamber adjacent to the exit of said chamber to cool work carried by said conveyor, said cooling means including a plurality of radiant heat absorbing means extending across said room, and means cooperating with some of said heat absorbing means and having a baffle portion extending between said heat absorbing means and work carried by said conveyor, said cooperating means including a reflector portion in said roof associated with said some of said heat absorbing means, said reflector portion being shaped to direct radiant heat emanating from the work to said heat absorbing means.

3. The combination of claim 2 including adjustable shield means to vary the amount of radiant heat directed by said reflector portions to said heat absorbing means.

4. In a furnace, structure forming an elongated chamber having an entrance, an exit and a roof, means to convey work to be heated through said chamber beneath said roof, means located in said roof adjacent to the entrance of said chamber to apply heat to work on said conveying means, a plurality of tubes through which a heat absorbing medium is adapted to be circulated located in said roof adjacent to the exit of said chamber, said tubes extending across said chamber, and cooperating means including a baffle portion extending between each tube and work on said conveying means to prevent direct radiation from the work from striking said tube, said cooperating means including a reflector portion located in said roof adjacent to each of said tubes, said reflector portions being shaped to reflect radiant heat from work on said conveying means to said tubes.

References Cited in the file of this patent

UNITED STATES PATENTS

| 1,563,562 | Gasser | Dec. 1, 1925 |
| 1,747,011 | Kerr | Feb. 11, 1930 |
| 1,802,407 | Danninger et al. | Apr. 28, 1931 |
| 1,830,788 | Forman | Nov. 10, 1931 |
| 1,895,547 | Lebel | Jan. 31, 1933 |
| 1,923,941 | Lufkin | Aug. 22, 1933 |
| 1,924,271 | Chapman | Aug. 29, 1933 |
| 1,955,163 | Adams | Apr. 17, 1934 |
| 2,066,376 | Walters | Jan. 5, 1937 |
| 2,215,079 | Hess | Sept. 17, 1940 |
| 2,437,492 | Allen | Mar. 9, 1948 |
| 2,651,503 | Mills | Sept. 8, 1953 |

FOREIGN PATENTS

| 242,198 | Great Britain | Nov. 5, 1925 |
| 730,265 | Great Britain | May 18, 1955 |